United States Patent [19] [11] 4,039,096
McAllister [45] Aug. 2, 1977

[54] WHEELCHAIR STORAGE APPARATUS

[76] Inventor: David E. McAllister, R.F.D. 2, Harrison, Maine 04040

[21] Appl. No.: 700,205

[22] Filed: June 28, 1976

[51] Int. Cl.² .............................................. B60R 9/00
[52] U.S. Cl. .............................. 214/450; 224/42.1 H
[58] Field of Search .......................... 214/450, 95 R; 224/42.1 H, 42.1 E

[56] References Cited

U.S. PATENT DOCUMENTS

| | | | |
|---|---|---|---|
| 3,715,044 | 2/1973 | Simons | 214/450 |
| 3,756,648 | 9/1973 | Greif | 214/450 |
| 3,823,839 | 7/1974 | Petzing et al. | 214/450 |
| 3,878,955 | 4/1975 | Udden | 214/450 |

Primary Examiner—Robert J. Spar
Assistant Examiner—Ross Weaver
Attorney, Agent, or Firm—William Nitkin

[57] ABSTRACT

Apparatus for the storage of a wheelchair on top of a motor vehicle, comprised of a ramp member resting upon the ground upon which said wheelchair is loaded by an individual sitting within said motor vehicle, the ramp being attached by beam members to means for raising the ramp from the ground level onto the top of said vehicle and means for lowering said ramp and wheelchair from the top of said vehicle to ground level, the lowering and raising means controlled from within said vehicle. The apparatus further includes a casing for enclosing the wheelchair and the lifting and lowering mechanisms on top of the vehicle.

4 Claims, 4 Drawing Figures

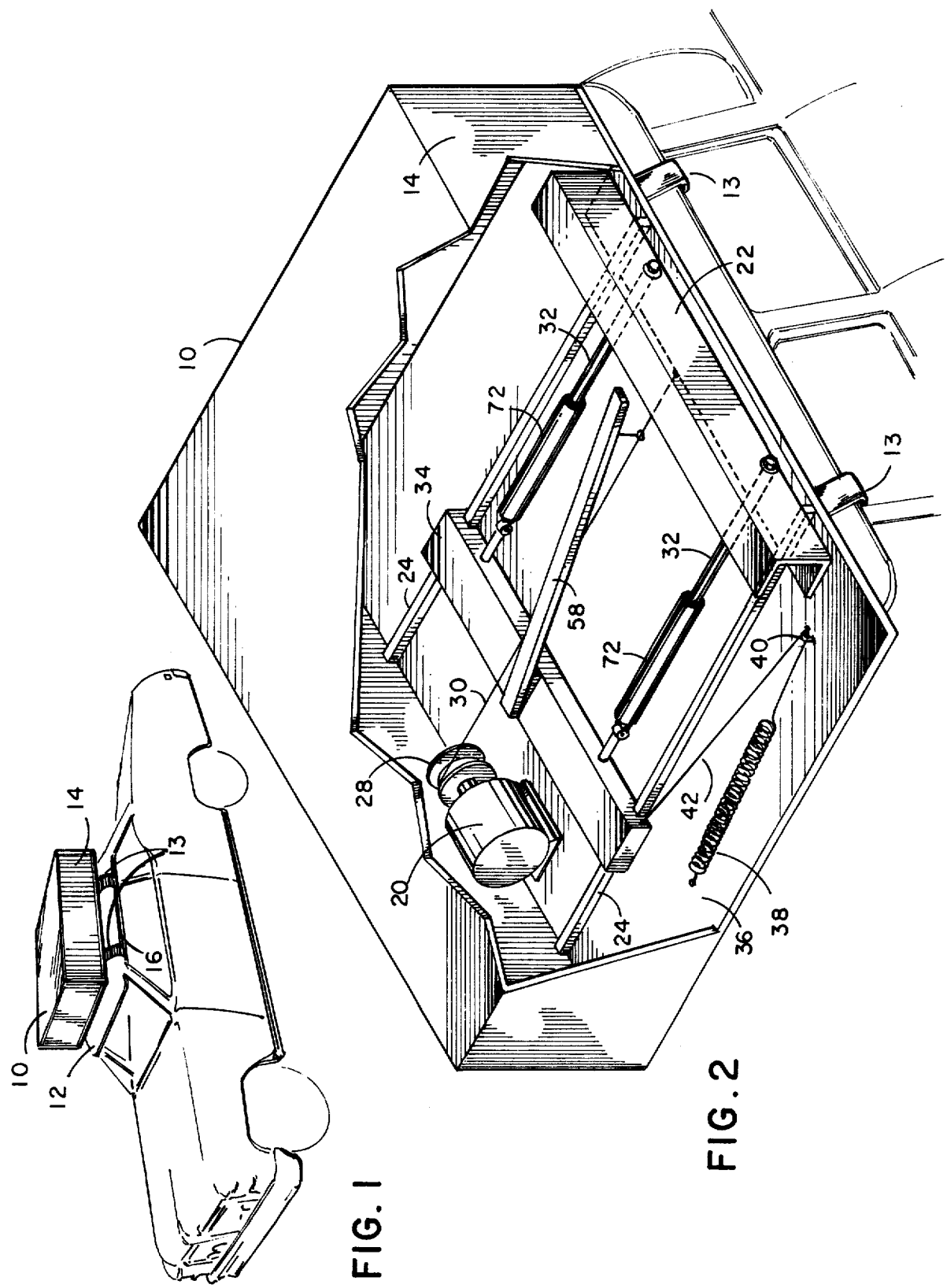

WHEELCHAIR STORAGE APPARATUS

BACKGROUND OF THE INVENTION

1. Field of the Invention

The present invention relates to an apparatus designed for use by a disabled individual for the lifting, lowering and storage of a wheelchair on top of a motor vehicle.

2. Description of the Prior Art

It is the desire of most disabled individuals who must rely on wheelchairs for mobility to be self-sufficient and to be able to increase their mobility through the use of hand-controlled motor vehicles. The main difficulty encountered by a disabled individual who is capable of operating a hand-controlled motor vehicle is the storage of his wheelchair. The need for an improved method of wheelchair storage to give disabled individuals greater mobility is heightened by the fact that the needs of the handicapped are being considered to a greater degree and access ramps are being provided in the construction of public buildings and sidewalks making it easier for wheelchair users to move about unassisted.

At present a disabled individual restricted to a wheelchair or other hand-controlled motorized vehicle for locomotion who wishes to operate a motor vehicle must first wheel himself to the motor vehicle, open the door of the vehicle and manually position himself behind the steering wheel. Then he must store his wheelchair in the vehicle. The storage of a wheelchair in a motor vehicle by a disabled individual is most difficult because in the usual practice, the wheelchair must be folded into its closed position and then maneuvered into the backseat area of the vehicle. This is an ackward and strenuous maneuver and can only be accomplished by those individuals possessing sufficient strength to lift a wheelchair weighing a minimum of 25 pounds into the backseat area from their sitting position in the front seat. Further resistance is met should the wheelchair strike either the backseat or the hump found in the middle of the floor of the vehicle which houses the drive shaft. The method of storage described above can only be used in a two-door vehicle where the front seat can be moved forward enabling the wheelchair to be maneuvered in immediately behind the front seat. It is extremely difficult for a disabled individual to store his wheelchair in the back seat area of a four-door vehicle. When the individual reaches his destination, he must reach behind and maneuver the wheelchair from his sitting position in the front seat out of the backseat area and into a position where he can open the wheelchair and manually place himself into it.

At present there are devices on the market which allow a wheelchair to be hung on the outside of the door of a motor vehicle. Use of this device has the disadvantage in that the wheelchair is exposed to the elements and is subject to being struck by other cars. Moreover unless a disabled individual has assistance, hanging and unhanging a wheelchair from the outside of a motor vehicle can present the same degree of ackwardness and difficulty as positioning a wheelchair into the backseat area of a motor vehicle.

The apparatus of this invention would allow disabled individuals to increase their travel in hand-controlled cars by eliminating the difficulties encountered in storing their wheelchairs.

SUMMARY

The device of this invention consists of an apparatus which is affixed to the top of a motor vehicle and includes a casing to protect it from the elements. In using the device of this invention, a disabled individual in a wheelchair wheels himself to the vehicle, opens the door in the normal manner and manually positions himself facing the door behind the vehicle's steering wheel. He then folds his wheelchair into its closed position which is approximately 12 inches wide and actuates the device of this invention from a control panel on the dashboard of the vehicle causing a ramp to lower over the side of the vehicle. When the ramp reaches ground level, the individual rolls his wheelchair onto the ramp and secures the wheelchair to the ramp. From the control panel, he activates the apparatus to raise the ramp containing the wheelchair into its storage compartment on top of the vehicle. The same procedure in reverse retrieves the wheelchair. The device of this invention, its construction and operation will become clearer with reference to the following drawings and Description of the Preferred Embodiment.

BRIEF DESCRIPTION OF THE DRAWINGS

FIG. 1 illustrates the apparatus of this invention in its casing on the roof of a motor vehicle.

FIG. 2 illustrates a cutaway view of the casing exposing the apparatus of this invention located within.

DESCRIPTION OF THE PREFERRED EMBODIMENT

Figure 3:
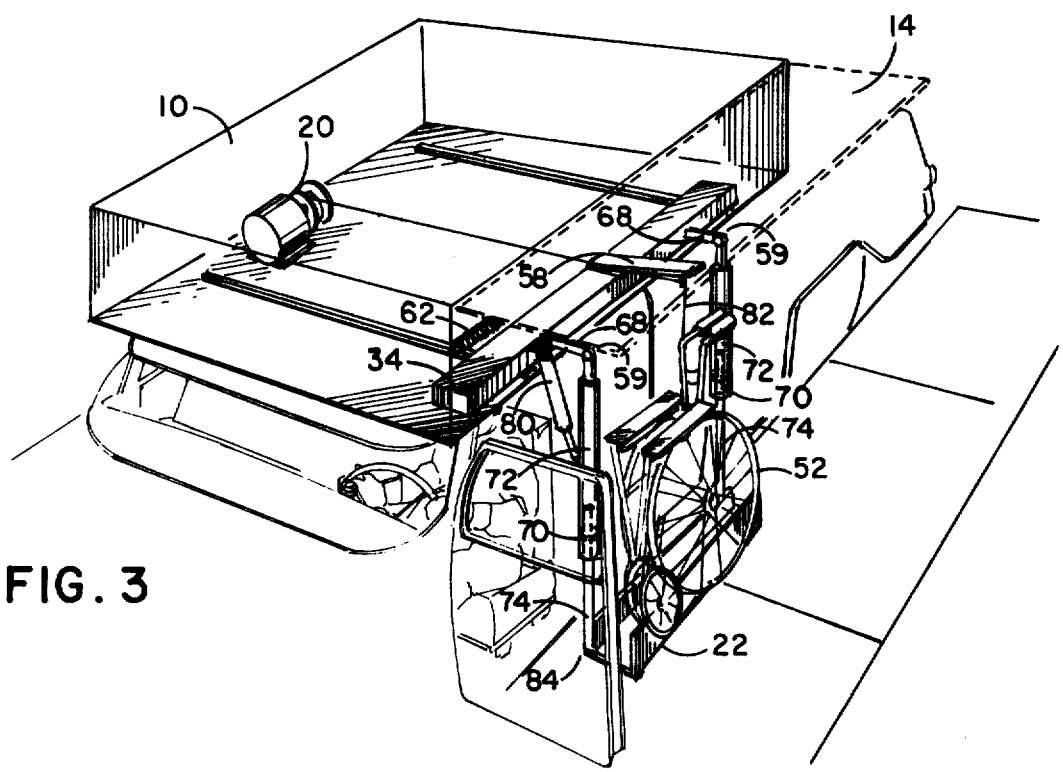
FIG. 3 illustrates the apparatus of this invention with the ramp in a lowered position with a wheelchair affixed thereon.

FIG. 1 illustrates casing 10 housing the apparatus of this invention affixed to roof 12 of a motor vehicle. The casing is shown affixed by attachment means 13 to rain gutters 16 of the vehicle. Other attachment means such as strap attachments, bolting or equivalents may be used. The apparatus can be located on the roof of the motor vehicle somewhat behind the left front door so as to allow room for a disabled individual from a front seat sitting position to maneuver his wheelchair onto the ramp of the device. Casing 10 can be made of fiberglas, sheet metal, plywood or any equivalent material of sufficiet strength to protect the apparatus and wheelchair contained within from the elements and the force of wind against the casing as the vehicle is being operated. Casing lid 14, shown in a closed position, can be opened by mechanical, electrical or equivalent means to allow for the raising and lowering of the enclosed ramp. It should be noted that a variety of mechanisms can be employed to raise or lower the ramp on which a wheelchair is placed for storage within its casing on top of a motor vehicle. Two such embodiments are discussed below, but it should be noted that other mechanisms for raising and lowering the ramp can be employed without deviating from the scope of this invention.

FIG. 2 illustrates a cutaway view of casing 10 showing the apparatus of this invention located within. The apparatus as illustrated is powered by winch motor 20 which can obtain its power from electric current generated by the motor vehicle. The motive force for the ramp raising and lowering mechanism can also be supplied from other suitable power means such as manual power, hydraulic power or equivalent. Ramp 22 can travel along tracks 24 which guide its entrance into and exit from casing 10. Such tracks are not necessary for the apparatus to operate but can be of assistance in some embodiments. Winch motor 20 drives winch drum 28 which winds and unwinds winch cable 30 affixed to ramp 22 resulting in the raising and lowering of the ramp. The ramp is attached by beam members 32 to guide member 34 which moves along floor 36 of casing 10 and, as mentioned above, in one embodiment can move on tracks 24 to eliminate unwanted lateral movement. After casing lid 14 is opened, in the winch-powered embodiment of this apparatus, spring member 38 can be utilized to move guide member 34 outward causing ramp 22 to lower and rest on the ground. The ramp remains in a lowered position by tension from lowering spring member 38 which passes through stationary spring mount 40 and is attached to spring member cable 42.

The front door of the motor vehicle illustrated in FIG. 3 is shown cutaway to better illustrate ramp 22 resting on the ground, folded wheelchair 52 placed thereon and which can be held there by a variety of means such as by straps, clamps, by activating the wheelchair's own braking mechanism or by equivalent means. When ramp 22 is to be lowered from its position within casing 10, casing lid 14 is first opened by means of casing lid opener 58 attached to the top of guide member 34. Casing lid 14 can be opened by other electrical or mechanical opening devices operated in conjunction with the lowering and raising mechanism of the ramp. When casing lid opener 58 is utilized, it extends outward from guide member 34 forcing casing lid 14 to open as ramp 22 moves outward and then downward. Since casing lid opener 58 projects outward when ramp 22 is resting on the ground, it holds the casing lid open. When the ramp is withdrawn into the casing, the casing lid closes as the ramp recedes into the casing. To keep the lid from flapping when the motor vehicle is in operation, casing lid spring 62 or equivalent closure means can be used. When ramp 22 is to be lowered, guide member 34 moves to the front edge of the floor of casing 10 and the beams supporting the ramp extend outward and then downward from the entrance of the casing. These beams can be comprised of upper beam members 72, lower beam members 74 and stationary beams 68, the latter allowing pivotal movement to take place at points 59 beyond the edge of the floor of the casing so that these beams will not strike the edge of the casing or the motor vehicle. One must be sure to have sufficient space to the left of the motor vehicle to allow the ramp to move outward and downward beside the motor vehicle without striking any objects or other vehicles. Upper beam members 72 and lower beam members 74 are joined together by adjustment means 70 which allow for vertical adjustment of the beam members for different heights of the sidewalk beside the vehicle. In one embodiment upper beam members 72 and lower beam members 74 can have compressible adjustment means causing the tubing of each lower beam member to slide into the tubing of its associated upper beam member. In one embodiment hydraulic beam lowering piston 80 can be employed to allow the ramp to be lowered slowly thereby preventing the ramp from falling with great force against the side of the motor vehicle or against the sidewalk. After the wheelchair is placed on the ramp and secured, the disabled individual then operates controls within the vehicle to activate the winch or equivalent power means to cause raising cable 82 to pull the guidemember-beam-ramp structure into the casing.

In one embodiment of the apparatus of this invention, a hydraulic system can be utilized in conjunction with scissors jacks to amplify the motion of the hydraulic pistons to cause inward and outward movement of the guide member of the raising and lowering mechanism. One of the important functions of beam adjustment means 70 becomes evident when the ramp is lowered to the ground. If the winch or other power means were turned on and if no such adjustment means were incorporated into the structure of the apparatus, back edge 84 of the ramp would, on its path upwards, strike the ground causing difficulty in raising the ramp. Adjustment means 70 allow the ramp to be lifted vertically first before being lifted at an angle on its way into the casing. The various beams incorporated within the mechanism of the apparatus of this invention can be constructed of tubular steel, aluminum, strong metal or equivalent material. Further, the casing on the roof of the motor vehicle can be aerodynamically designed to reduce wind friction when the motor vehicle is in operation.

Figure 4:
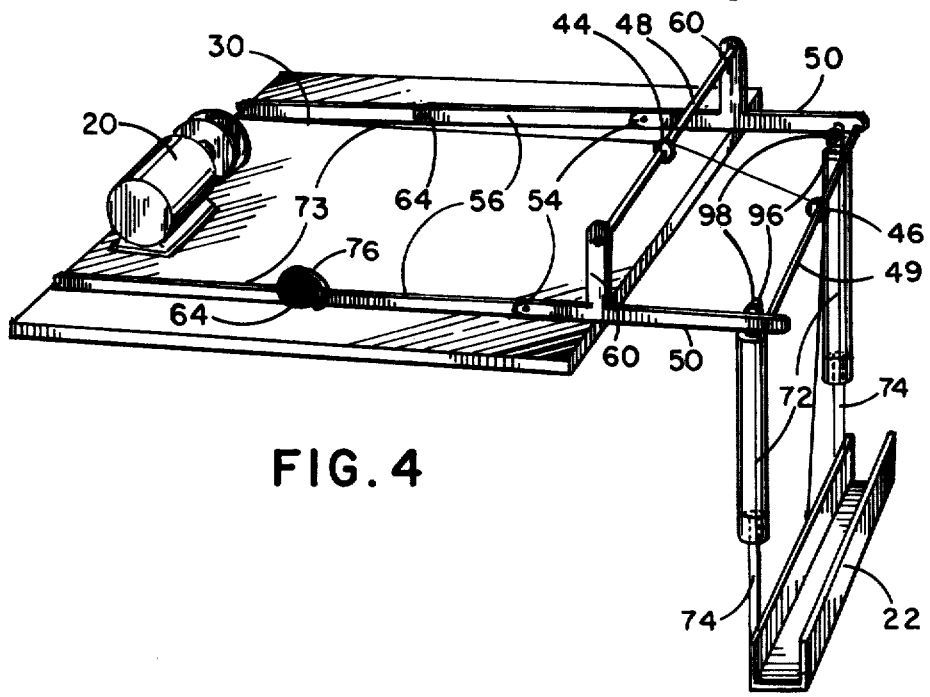
FIG. 4 illustrates one embodiment of the lifting and lowering mechanism of the apparatus of this invention.

An embodiment incorporating a rotational type of raising and lowering mechanism also found to work successfully is illustrated in FIG. 4. To lift ramp 22, winch motor 20 which can be activated by a control panel within the motor vehicle by means of winch cable 30, causes lower beam 74 first to move upwards so that it is parallel to upper beam 72. This shortened beam support system for ramp 22 is pivotally attached at points 96 to upper beam attachment members 98 of the parallel arms of frame raising members 50. Frame raising members 50 are pivotally attached at points 54 to frame pivotal members 56 and have frame lever members 60 extending upward at a 90° angle from their top surface near their junction with frame pivotal members 56. First crossbeam 48 runs between frame lever members 60, and second crossbeam 49 runs between frame raising members 50 near the frame raising members' junction with upper beam attachment members 98. On first and second crossbeams 48 and 49 are located their respective cable pulleys 44 and 46 over which winch cable 30 runs from winch motor 20 to its connection with ramp 22. When in operation the winch first lifts lower beam members 74 parallel to upper beam members 72 and when their stopping points are reached, the pull of winch cable 30 starts to raise frame raising members 50 to an upright vertical position until frame lever members 60 make contact with frame pivotal members 56. At this point in time the entire assembly of frame raising members 50 and frame lever members 60 start to pivot at pivotal junction 64 where frame pivotal members 56 meet frame members 73 that are affixed to the floor of casing 10. This entire apparatus continues to rotate inward causing upper and lower beam members 72 and 74 and ramp with wheelchair secured thereto to move between frame members 73 to a resting position within the casing. As ramp 22 is being pulled into its casing, rotary spring member 76 winds creating tension in its spring. A second rotary spring member, not illustrated, may also be located at the opposite pivotal junction 64 of frame pivotal members 56 and frame members 73. To lower ramp 22, the casing lid, not illustrated in FIG. 4, is first opened by mechanical, electrical or equivalent means. When winch motor 20 is activated in the reverse direction, winch cable 30 unwinds and rotary spring member 76 forces the entire framing mechanism to rotate in the reverse direction until frame raising members 50 are in a position whereby the weight of ramp 22 pulls frame raising members 50 to their fully extended position at which point upper and lower beam members 72 and 74 are outside the casing and drop slowly to ground level.

Although the present invention has been described with reference to particular embodiments, it will be apparent to those skilled in the art that variations and modifications can be substituted therefor without departing from the principles and spirit of the invention.

I claim:

1. An apparatus for storage of a wheelchair on top of a motor vehicle comprising:
   a ramp member upon which said wheelchair is loaded;
   at least one beam member affixed to said ramp member;
   a casing, having an opening, mounted on the top of said vehicle;
   a frame member affixed to the floor of said casing;
   a frame pivotal member pivotally attached at one end to said frame member;
   a frame raising member pivotally attached at one end to the other end of said frame pivotal member;
   a frame lever member affixed perpendicularly to said frame raising member;
   an upper beam attachment member affixed to the other end of said frame raising member for the pivotal attachment of said beam member; and
   means for rotating said frame pivotal member and frame raising member in order to raise said ramp and beam member into said casing and to lower said ramp and beam member to ground level upon reversing the direction of rotation.

2. An apparatus as recited in claim 1 wherein said means for rotating said frame pivotal member and frame raising member comprise:
   a winch positioned within said casing affixed by a cable to said ramp member; and
   a spring member affixed at one end to said frame member and, at its other end, affixed to said pivotal member.

3. An apparatus as recited in claim 1 further including a casing lid hinged at the top of said casing opening and means for raising and lowering said casing lid.

4. An apparatus as recited in claim 1 further including means for varying the length of said beam member.

* * * * *